United States Patent
Kawakami

(10) Patent No.: US 9,249,052 B2
(45) Date of Patent: Feb. 2, 2016

(54) FIBER FOR REINFORCING CEMENT, AND CURED CEMENT PRODUCED USING SAME

(71) Applicants: DAIWABO HOLDINGS CO., LTD., Osaka-shi, Osaka (JP); DAIWABO POLYTEC CO., LTD., Osaka-shi, Osaka (JP)

(72) Inventor: Shigeki Kawakami, Hyogo (JP)

(73) Assignees: DAIWABO HOLDINGS CO., LTD., Osaka (JP); DAIWABO POLYTEC CO., LTD., Osaka (JP)

( * ) Notice: Subject to any disclaimer, the term of this patent is extended or adjusted under 35 U.S.C. 154(b) by 0 days.

(21) Appl. No.: 14/381,132

(22) PCT Filed: Feb. 25, 2013

(86) PCT No.: PCT/JP2013/054787
§ 371 (c)(1),
(2) Date: Aug. 26, 2014

(87) PCT Pub. No.: WO2013/129323
PCT Pub. Date: Sep. 6, 2013

(65) Prior Publication Data
US 2015/0038618 A1    Feb. 5, 2015

(30) Foreign Application Priority Data
Feb. 29, 2012    (JP) .................... 2012-043392

(51) Int. Cl.
| C04B 16/06 | (2006.01) |
| D06M 13/295 | (2006.01) |
| C04B 28/02 | (2006.01) |
| D06M 10/02 | (2006.01) |
| C04B 20/10 | (2006.01) |
| D06M 13/17 | (2006.01) |
| D06M 101/20 | (2006.01) |

(52) U.S. Cl.
CPC ......... *C04B 16/0633* (2013.01); *C04B 16/0625* (2013.01); *C04B 20/1014* (2013.01); *C04B 20/1018* (2013.01); *C04B 28/02* (2013.01); *D06M 10/02* (2013.01); *D06M 10/025* (2013.01); *D06M 13/17* (2013.01); *D06M 13/295* (2013.01); *D06M 2101/20* (2013.01)

(58) Field of Classification Search
CPC ........... C04B 16/0625; C04B 16/0633; D06M 13/295
See application file for complete search history.

(56) References Cited

U.S. PATENT DOCUMENTS

| 5,338,357 A | 8/1994 | Takai et al. |
| 6,010,786 A | 1/2000 | Takai |
| 2006/0182965 A1* | 8/2006 | Kitaguchi et al. ............ 428/375 |
| 2010/0173547 A1* | 7/2010 | Katayama et al. ................ 442/1 |

FOREIGN PATENT DOCUMENTS

| EP | 0 535 373 | 4/1993 |
| EP | 0 537 129 | 4/1993 |
| JP | 5-170497 | 7/1993 |
| JP | 6-219797 | 8/1994 |
| JP | 10-236855 | 9/1998 |
| JP | 2001-058858 | 3/2001 |
| JP | 2002-069752 | 3/2002 |
| JP | 2002-227074 | 8/2002 |
| JP | 2006-096565 | 4/2006 |
| JP | 2010-070875 | 4/2010 |
| JP | 2011-074500 | 4/2011 |
| JP | 2012-117192 | 6/2012 |
| JP | 2012-229506 | 11/2012 |

* cited by examiner

*Primary Examiner* — Vickey Nerangis
(74) *Attorney, Agent, or Firm* — Hamre, Schumann, Mueller & Larson, P.C.

(57) ABSTRACT

A cement reinforcing fiber of the present invention is a cement reinforcing fiber made of a polyolefin fiber, wherein a fiber treating agent is adhered to a surface of the polyolefin fiber, and the fiber treating agent is a polyoxyethylene alkyl phosphoric ester salt. One preferred polyoxyethylene alkyl phosphoric ester salt is a compound represented by chemical formula (2) below. A cured cement of the present invention contains the above-described cement reinforcing fiber.

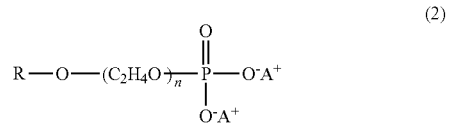

In the chemical formula (2) above, R is an alkyl group with a carbon number of 2 to 20, A is an alkali metal element, and n is 1 to 20.

10 Claims, No Drawings

FIBER FOR REINFORCING CEMENT, AND CURED CEMENT PRODUCED USING SAME

TECHNICAL FIELD

The present invention relates to a cement reinforcing fiber made of a polyolefin fiber, and a cured cement using the same.

BACKGROUND ART

Polyolefin fibers such as a polypropylene fiber are strong and lightweight, and are used widely in an industrial application, and the like. In order to reinforce the impact strength and the bending strength of a hydraulic cured body such as concrete and mortar, short fibers made of polypropylene, vinylon, and the like are used as reinforcing fibers. As the reinforcing fibers, fibers having excellent fiber strength and fiber elongation have been used. For obtaining such fibers having excellent strength and elongation, the selection of polymers, etc., has been performed. In particular, as reinforcing fibers for autoclave curing concrete, vinylon cannot be used because it decomposes, whereas polyolefin such as polypropylene has been put into practical use because of its stability. In some cases, a fiber treating agent (also called as a fiber finishing oil) is adhered to the cement reinforcing fibers for the purpose of uniformly dispersing reinforcing fibers in a hydraulic cured body. For example, Patent Document 1 describes cement reinforcing fibers to which a fiber treating agent containing an alkyl phosphate represented by the following chemical formula (1) as a main component has been adhered.

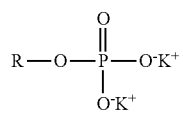

(1)

Further, as another method for uniformly dispersing reinforcing fibers in a hydraulic cured body, it has been studied to improve an affinity of fibers for a hydraulic cured body by hydrophilizing fibers through a hydrophilization treatment such as a fluorine treatment, a plasma discharge treatment, and a corona discharge treatment. For example, Patent Document 2 describes cement reinforcing fibers obtained by subjecting fibers to any one of a surface treatment selected from a corona discharge treatment, an atmospheric plasma treatment, and an ozone aqueous solution treatment, and then adhering a fiber treating agent to the surface-treated fibers.

PRIOR ART DOCUMENTS

Patent Documents

Patent Document 1: JP H05(1993)-170497 A
Patent Document 2: JP 2001-058858 A

DISCLOSURE OF INVENTION

Problem to be Solved by the Invention

However, the cement reinforcing fibers described in Patent Document 1 that use the fiber treating agent containing an alkyl phosphate as a main component have the following problem. During dispersion and stirring of the cement reinforcing fibers into a hydraulic cured body (e.g., cement slurry), the fiber treating agent, which has been adhered to the fibers, drops off, and the formerly treated fibers form fiber balls (lump). Because of this, the fibers do not disperse in the hydraulic cured body uniformly, and the strength of the hydraulic cured body becomes uneven, resulting in a decrease in strength of the hydraulic cured body as a whole. Further, since the cement reinforcing fibers described in Patent Document 1 that use the fiber treating agent containing a phosphate as a main component have poor affinity for a hydraulic cured body, they fall off easily from the hydraulic cured body, and hence do not impart sufficient strength to the hydraulic cured body.

In order to solve the above-described conventional problems, the present invention provides cement reinforcing fibers having a high affinity for a hydraulic cured body such as a hydraulic cement while preventing a fiber treating agent from dropping off easily, and a cured cement using the same.

Means for Solving Problem

A cement reinforcing fiber of the present invention is a cement reinforcing fiber made of a polyolefin fiber, wherein a fiber treating agent is adhered to a surface of the polyolefin fiber, and the fiber treating agent is a polyoxyethylene alkyl phosphoric ester salt.

A cured cement of the present invention contains the above-described cement reinforcing fiber.

Effect of the Invention

The cement reinforcing fiber of the present invention is a cement reinforcing fiber made of a polyolefin fiber. By adhering a polyoxyethylene alkyl phosphoric ester salt as a fiber treating agent to the surface of the polyolefin fiber, it is possible to provide a cement reinforcing fiber that has a high affinity for a hydraulic cured body such as a cured cement while preventing the fiber treating agent from dropping off easily. Further, a cured cement containing the above-described cement reinforcing fiber is excellent in cement strength.

DESCRIPTION OF THE INVENTION

The present inventor has achieved the present invention based on the following findings: cement reinforcing fibers to which a fiber treating agent containing a polyoxyethylene alkyl phosphoric ester salt as a main component has been adhered have a high affinity for a hydraulic cured body while preventing the fiber treating agent from dropping off easily. Further, the present inventor has found that the fiber treating agent containing an alkyl phosphoric ester salt as a main component disclosed in Patent Document 1 reduces the fibers' compatibility with a hydraulic cured body when applied to fibers that have been subjected to a hydrophilization treatment such as a corona discharge treatment, whereas the fiber treating agent containing a polyoxyethylene alkyl phosphoric ester salt as a main component does not reduce the fibers' compatability with a hydraulic cured body even when applied to the fibers that have been subjected to a hydrophilization treatment such as a corona discharge treatment. In the present invention, the "main component" of the fiber treating agent refers to a component contained in an amount of 80% by mass (mass %) or more, preferably in an amount of 90 mass % or more, and further preferably in an amount of 100 mass % or more based on the components of the fiber treating agent other than water (solid content). The same applies to the following description.

The polyoxyethylene alkyl phosphoric ester salt preferably has an ionic functional group. If the polyoxyethylene alkyl phosphoric ester salt has an ionic functional group, the ionic functional group is substituted with calcium ions ($Ca^{2+}$) in a cement mixture, whereby a cured cement that is further excellent in strength can be obtained. In the case where the polyoxyethylene alkyl phosphoric ester salt contains a nonionic polyoxyethylene alkyl phosphoric ester salt, a content ratio thereof is preferably 10 mol % or less, more preferably 5 mol % or less, and particularly preferably substantially 0 mol % based on 100 mol % of the polyoxyethylene alkyl phosphoric ester salt.

The polyoxyethylene alkyl phosphoric ester salt preferably is at least one compound selected from the group consisting of a compound represented by chemical formula (2) below and a compound represented by chemical formula (3) below.

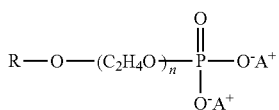
(2)

In chemical formula (2), R is an alkyl group with a carbon number of 2 to 20, A is an alkali metal element or an alkaline-earth metal element, and n is 1 to 20.

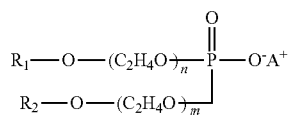
(3)

In chemical formula (3), $R_1$ and $R_2$ are an alkyl group with a carbon number of 2 to 20, A is an alkali metal element or an alkaline-earth metal element, and n and m are 1 to 20.

The polyoxyethylene alkyl phosphoric ester salt preferably is a mixture of the compound represented by chemical formula (2) above and the compound represented by chemical formula (3) above. In this case, the ratio of the compound represented by chemical formula (2) is preferably in a range of 20 to 80 mol %, and more preferably in a range of 50 to 80 mol % based on 100 mol % of the polyoxyethylene alkyl phosphoric ester salt. Further, the ratio of the compound represented by chemical formula (3) is preferably in a range of 20 to 80 mol %, and more preferably in a range of 20 to 50 mol % based on 100 mol % of the polyoxyethylene alkyl phosphoric ester salt. When the ratio of the compound represented by chemical formula (2) is 20 mol % or more, the salt can dissolve easily in water and attach to fibers easily. Further, when the ratio of the compound represented by chemical formula (2) is 50 mol % or more, the salt will contain a large amount of the compound containing two $-O^-A^+$ groups in one mole, which makes it possible to obtain fibers particularly excellent in affinity for cement.

In chemical formula (2) or (3) above, the alkali metal element indicated as A is preferably Li, Na, K, Rb and the like, and particularly preferably potassium (K). The polyoxyethylene alkyl phosphoric ester salt is more preferably a compound represented by chemical formula (4) or (5) below.

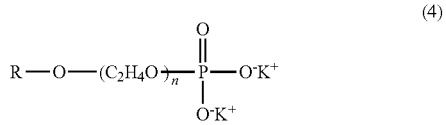
(4)

In chemical formula (4), R is an alkyl group with a carbon number of 2 to 20, and n is 1 to 20.

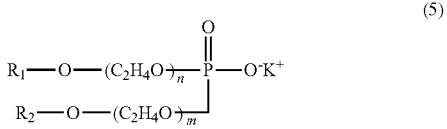
(5)

In chemical formula (5), $R_1$ and $R_2$ are an alkyl group with a carbon number of 2 to 20, and n and m are 1 to 20.

The adhesion amount of the polyoxyethylene alkyl phosphoric ester salt is preferably in a range of 0.05 to 10 mass %, and more preferably in a range of 0.1 to 5 mass % based on 100 mass % of the polyolefin fibers. Within these ranges, the fiber treating agent is further less likely to drop off from the polyolefin fibers, and the affinity of the polyolefin fibers for a hydraulic cured body will be enhanced further.

The polyolefin fibers may be hydrophilized through at least one hydrophilization treatment selected from a fluorine gas treatment, a plasma discharge treatment, and a corona discharge treatment. When the polyolefin fibers are hydrophilized, the affinity for a hydraulic cured body such as a cured cement will be enhanced further.

Inorganic particles may be dispersed in the polyolefin fibers. Dispersion of the inorganic particles in the polyolefin fibers further enhances the affinity for a hydraulic cured body such as cement, and enhances the strength accordingly. Moreover, the fibers are less likely to float during dispersion because the inorganic particles increase the apparent specific gravity of the fibers. The content of the inorganic particles is preferably in a range of 0.1 to 20 mass %, and more preferably in a range of 1 to 10 mass % based on 100 mass % of the polyolefin fibers.

When the polyolefin fibers contain the inorganic particles, it is preferable that the polyolefin fibers are obtained as core-sheath conjugate fibers, and the sheath component contains the inorganic particles. If the sheath component contains the inorganic particles, protrusions are formed on the fiber surface, so that the fibers are less likely to fall off from the cured cement. Thus, the bending strength of the cured cement is improved. The content of the inorganic particles is preferably in a range of 0.1 to 40 mass %, and more preferably in a range of 1 to 20 mass % based on 100 mass % of the sheath component of the polyolefin fiber. Incidentally, the core component may contain or not contain the inorganic particles.

The inorganic particles are not limited particularly, and known inorganic particles can be used. Examples of the inorganic particle include at least one particle selected from the group consisting of magnesium carbonate, silicone oxide, aluminum oxide, barium sulfate, calcium carbonate, talc, and the like.

The inorganic particles have an average particle diameter of preferably 0.1 to 10 μm, more preferably 0.2 to 5 μm, and further preferably 0.3 to 2 μm. When the average particle diameter of the inorganic particles is 0.1 μm or more, protrusions are formed on the fiber surface, which makes it possible to obtain a more remarkable effect of preventing fibers from falling off easily from the cured cement. When the average particle diameter of the inorganic particles is 10 µm or less, yarns do not break in a fiber spinning process, and the inorganic particles are less likely to drop off from the surface of the obtained fibers. A particle size distribution measurement device (trade name: SALD-2000, manufactured by Shimadzu Corporation) was used to measure the average particle diameter of the inorganic particles.

In chemical formulae (2), (3), (4) and (5) above, n and m, each representing the number of moles of an oxyethylene group, are more preferably 1 to 15, and further preferably 3 to 7. The affinity for a hydraulic cured body tends to improve as the numbers of moles n and m of the oxyethylene group increase. However, when n and m are too large, the flowability decreases, which may cause the fiber treating agent to adhere to the fibers unevenly. Further, in chemical formulae (2), (3), (4) and (5) above, the carbon numbers of R, $R_1$ and $R_2$ are more preferably 8 to 18, and further preferably 6 to 16. The hydrophilicity tends to decrease as alkyl chain lengths (carbon chain lengths) of R, $R_1$ and $R_2$ increase, and the fiber treating agent tends to drop off easily from the fibers as the alkyl chain lengths decrease. When the numbers of moles n and m of the oxyethylene group and the alkyl chain lengths of the of R, $R_1$ and $R_2$ are within these ranges, the fiber treating agent is further less likely to drop off from the polyolefin fibers, and the affinity of the polyolefin fibers for a hydraulic cured body will be enhanced further.

Though not limited particularly, the cement reinforcing fibers of the present invention can be obtained as follows, for example: spinning polyolefin-based resin by a known melt spinning method; drawing the obtained spun filaments at a predetermined ratio in hot water, wet heat, or dry heat; and applying or impregnating the drawn filaments with the fiber treating agent. The drawing processing is preferably performed under dry drawing, and the drawing temperature may be set at 145° C. to 165° C., for example. In terms of obtaining fibers that are excellent for reinforcing cement by increasing the single fiber strength and lowering the fiber elongation, the draw ratio is preferably 2 to 10 times, and more preferably 2.5 to 5 times. By drawing undrawn filaments obtained by spinning, molecular chains are oriented in the drawing direction, whereby fibers excellent in single fiber strength and fiber elongation can be obtained.

Before application or impregnation with the fiber treating agent, the filaments after drawing may be hydrophilized through at least one hydrophilization treatment selected from a fluorine gas treatment, a plasma discharge treatment, and a corona discharge treatment so as to further enhance the affinity for a hydraulic cured body such as a cured cement. Further, the inorganic particles can be dispersed in the cement reinforcing fibers by kneading them into polyolefin-based resin and subjecting the mix to melt spinning.

In the present invention, a method of attaching the fiber treating agent may be an immersion method, a spraying method, or a coating method. When subjecting the fibers to a corona discharge treatment, the discharge amount per treatment is preferably, but is not particularly limited to, 50 $W/m^2$/min or more, and the total discharge amount is preferably 100 to 5000 $W/m^2$/min, and more preferably 250 to 5000 $W/m^2$/min. When subjecting the fibers to a plasma treatment, the treatment is preferably, but is not particularly limited to, an atmospheric plasma treatment, and it is suitable that the fibers are subjected to the treatment at a voltage of 50 to 250 kV and frequency of 500 to 3000 pps. An atmospheric plasma treatment is preferred because it is possible to treat the fibers at a low voltage, which results in less fiber deterioration. Further, a fluorine gas treatment can be performed using, but not particularly limited to, a mixed gas of fluorine gas and oxygen gas or a mixed gas of fluorine gas and sulfurous acid gas.

It is preferred that the cement reinforcing fibers of the present invention are fibers obtained by adhering the fiber treating agent to the fibers that have been hydrophilized through at least one hydrophilization treatment selected from a fluorine gas treatment, a plasma discharge treatment, and a corona discharge treatment. This configuration further enhances the affinity for cement. Moreover, a cured cement containing the cement reinforcing fibers with this configuration has an excellent modulus of rupture.

Regarding conventional fiber treating agents (such as the fiber treating agent represented by chemical formula (1) above), fibers are allowed to be dispersed easily in a cement mixture by orienting hydrophilic groups to the outside in the fiber surface for hydrophilization of the hydrophobic fiber surface. However, in the state where the fiber surface has been hydrophilized in advance, hydrophilic groups are oriented to the fiber side in part of the fiber treating agent. Hence, the hydrophilizing ability cannot be exhibited fully and/or the hydrophilizing ability is cancelled by the hydrophilized fiber surface. Thus, a synergistic effect cannot be obtained even when the fiber treating agent is adhered to the hydrophilized fibers, resulting in decreases in the affinity for cement and the modulus of rupture of cement.

The cement reinforcing fibers of the present invention do not have the above-described problem, and it is possible to obtain cement reinforcing fibers particularly excellent in affinity for cement even in the case of adhering the fiber treating agent to the fibers that have been hydrophilized through at least one hydrophilization treatment selected from a fluorine gas treatment, a plasma discharge treatment, and a corona discharge treatment. Further, the cement reinforcing fibers of the present invention increase the modulus of rupture of cement. The possible explanation for this is as follows. Owing to the presence of two hydrophilic groups in the fiber treating agent, i.e., a polyoxyethylene group and a phosphoric acid base, there is a low possibility that hydrophilic groups are oriented to the fiber side, or even when one of the hydrophilic groups is oriented to the fiber side, hydrophilicity can be obtained by the other hydrophilic group.

The polyolefin to be used in the present invention is not limited particularly, and examples thereof include; a homopolymer of an α-olefin with a carbon number of about 2 to 20; a copolymer of at least two α-olefins with a carbon number of about 2 to 20; and a copolymer of an α-olefin with a carbon number of about 2 to 20 and vinyl acetate, (meth) acrylic acid, (meth)acrylic ester, and the like. Examples of the α-olefin with a carbon number of about 2 to 20 include ethylene, propylene, 1-butene, 3-methyl-1-butene, 1-pentene, 4-methyl-1-pentene, 1-hexene, 1-octene, and 1-decene. Among these, the polyolefin is preferably polypropylene. By use of polypropylene, it is possible to obtain polyolefin fibers having high single fiber strength at low cost. The above-described polypropylene may be a homopolymer of propylene, or a copolymer of propylene and other α-olefins with a carbon number of about 2 to 20.

The polyolefin to be used in the present invention may be polymerized by any polymerization method. For example, when the polyolefin is polypropylene, polypropylene may be polymerized using a metallocene catalyst or a Ziegler-Natta catalyst.

In terms of high single fiber strength and light weight, the polyolefin fibers are preferably polypropylene fibers, and more preferably polypropylene fibers having a Z average molecular weight Mz of less than 1,000,000 and a ratio between a weight average molecular weight Mw and a number average molecular weight Mn in a range of more than 4 to 5 or less. Further, in terms of obtaining high crystallinity polypropylene fibers at low cost, it is preferable that the polypropylene fibers are polypropylene fibers having a Z average molecular weight Mz of less than 1,000,000 and a ratio between the weight average molecular weight Mw and the number average molecular weight Mn in a range of more than 4 to 5 or less, the fibers being obtained by subjecting polypropylene having a Z average molecular weight Mz of 1,000,000 or more and a ratio between the weight average molecular weight Mw and the number average molecular weight Mn of more than 5 to melt spinning at a temperature of 300° C. to 400° C., followed by drawing. In the above description, a value of the ratio between the weight average molecular weight Mw and the number average molecular weight Mn indicates polymer polydispersity, meaning that the smaller the value, the narrower the molecular weight distribution.

Generally the melt spinning of polypropylene is performed at a temperature of less than 300° C., e.g., in a range of 180° C. to 280° C. However, by setting the temperature of the melt spinning in a range of 300° C. to 400° C., spinnability and drawability become favorable even in the case of using polypropylene having a Z average molecular weight Mz of 1,000,000 or more and a ratio between the weight average molecular weight Mw and the number average molecular weight Mn of more than 5, so that it is possible to obtain polypropylene fibers having a Z average molecular weight Mz of less than 1,000,000 and a ratio between the weight average molecular weight Mw and the number average molecular weight Mn in a range of more than 4 to 5 or less (hereinafter, referred to as polypropylene fibers A). In the production of the polypropylene fibers A, the temperature of the melt spinning is preferably in a range of 330° C. to 380° C., and more preferably in a range of 340° C. to 370° C. When the temperature of the melt spinning is within the above-described ranges, the control of adjusting the molecular weight of high molecular weight polymers by thermal decomposition can be more stable. Further, there is a low possibility that polymer chains decompose thermally excessively and the fiber strength and the like decrease. Incidentally, the thermal decomposition is also affected by a residence time of melt polymers, but it is difficult to change the residence time in a practical production. A general residence time (about 5 to 15 minutes) may be adopted.

In the melt spinning of the polypropylene fibers A, the temperature of the spinning (melt spinning) refers to a temperature in a highest temperature region among temperatures to be applied during spinning of a raw material polymer. For example, it may be an internal temperature of a polymer kneader, an internal temperature of an extruder, or a temperature of a spinneret.

In the production of the polypropylene fibers A, the internal temperature of a polymer kneader and/or an extruder is preferably 300° C. to 400° C., and more preferably 325° C. to 365° C. Setting the internal temperature of a polymer kneader and/or an extruder at 300° C. or higher enhances thermal decomposition of high molecular weight polymers. Further, setting the internal temperature of a polymer kneader and/or an extruder at 400° C. or lower prevents excessive thermal decomposition and suppresses degradation of the fiber strength due to an extreme decrease in the molecular weight.

In the production of the polypropylene fibers A, the temperature of a spinneret is lower than the internal temperature of a polymer kneader and/or an extruder preferably by 10° C. or more and more preferably by 30° C. or more. With this configuration, there is no or low possibility that spun filaments are fused with each other at the time of taking up filaments even when the spinning temperature is 300° C. or higher. Specifically, the temperature of a spinneret is preferably 255° C. to 295° C.

In the production of the polypropylene fibers A, the polypropylene to be supplied for melt spinning has a fusion enthalpy $\Delta H_{P1}$ of preferably less than 80 J/g, more preferably 50 J/g or more and less than 80 J/g, and further preferably 50 to 79 J/g. The higher the fusion enthalpy $\Delta H_{P1}$, the better the crystallinity. If the polypropylene has a fusion enthalpy $\Delta H_{P1}$ of less than 80 J/g, it can be decomposed thermally with ease, and spinnability and drawability become favorable.

The polypropylene fibers A after spinning have a fusion enthalpy $\Delta H_F$ of preferably 100 J/g or more, and more preferably 110 J/g or more. If the polypropylene fibers A after spinning have a fusion enthalpy $\Delta H_F$ of 100 J/g or more, fibers excellent in single fiber strength can be obtained easily. Incidentally, a favorable upper limit of $\Delta H_F$ is 140 J/g.

The polypropylene fibers A preferably have a fusion enthalpy $\Delta H_{P2}$ of 80 to 100 J/g, the fusion enthalpy $\Delta H_{P2}$ being measured by the method below. The $\Delta H_{P2}$ is a fusion enthalpy of polymers at the time when fibers are once molten after spinning and then re-solidified, and indicates the degree of crystallization of polymers in the state where the fiber orientation is destroyed. Further, the larger the value of $\Delta H_{P2}$ is, the higher the natural orientation of polymers.

(Measurement Method of $\Delta H_{P2}$)

The temperature of the fibers is raised from 20° C. to 200° C. at a speed of 10° C./minute, then lowered from 200° C. to 20° C. at a speed of 10° C./minute, and again raised from 20° C. to 200° C. at a speed of 10° C./minute. The endothermic energy at this time is defined as a fusion enthalpy $\Delta H_{P2}$.

The polypropylene fibers A preferably have $\Delta H_F$-$\Delta H_{P2}$ of 25 J/g or more. The $\Delta H_F$-$\Delta H_{P2}$ is a value obtained by subtracting the natural orientation of polymers from the orientation of fibers, and an indicator indicating the degree of crystal orientation of molecular chains in the fiber state. When the $\Delta H_F$-$\Delta H_{P2}$ is 25 J/g or more, a high proportion of molecular chains is aligned regularly, which makes it possible to obtain fibers that are excellent in single fiber strength and fiber elongation even when using polymers of low crystallinity. Further, such fibers are expected to have a low dry-heat shrinkage ratio and exhibit less fiber shrinkage phenomenon (drawing return) after the drawing step.

In the production of the polypropylene fibers A, it is preferable that the polypropylene to be supplied for melt spinning has a ratio between the Z average molecular weight Mz and the weight average molecular weight Mw of more than 3, and the polypropylene fibers A after spinning have a ratio between the Z average molecular weight Mz and the weight average molecular weight Mw of more than 2.55 and less than 3. More preferably, the polypropylene to be supplied for melt spinning has a ratio between the Z average molecular weight Mz and the weight average molecular weight Mw of 3.1 or more, and the polypropylene fibers A after spinning have a ratio between the Z average molecular weight Mz and the weight average molecular weight Mw of 2.60 to 2.95. The ratio between the Z average molecular weight Mz and the weight average molecular weight Mw also indicates polymer polydispersity, meaning that polypropylene pellets have a relatively wide molecular weight distribution but the polypropylene fibers A have a relatively narrow molecular weight distribution. Such polypropylene pellets are available at relatively low cost.

The polypropylene fibers A are polypropylene fibers having a Z average molecular weight Mz of less than 1,000,000 and a ratio between the weight average molecular weight Mw and the number average molecular weight Mn in a range of more than 4 to 5 or less. Preferably, the polypropylene fibers A are polypropylene fibers having a ratio between the weight average molecular weight Mw and the number average molecular weight Mn in a range of 4.1 to 5. Further, the polypropylene fibers A have a ratio between the Z average molecular weight Mz and the weight average molecular weight Mw of preferably more than 2.55 and less than 3, and more preferably 2.6 to 2.95. Such polypropylene fibers A have a relatively narrow molecular weight distribution.

The ratio of a number average molecular weight $Mn_F$ of the polypropylene fibers A after spinning with respect to a number average molecular weight $Mn_P$ of the polypropylene to be supplied for melt spinning is preferably 0.9 to 1.1, and more preferably 0.95 to 1.05. The $Mn_F/Mn_P$ indicates the change amount of the number average molecular weight of polymers before and after spinning, meaning that the closer the value is to 1, the less the change in the number average molecular weight of polymers before and after spinning. When the $Mn_F/Mn_P$ is in a range of 0.9 to 1.1, the number of molecules whose weight has been changed due to thermal decomposition is few, whereby fibers can be prevented from having an extremely low fiber strength.

Specifically, the polypropylene pellet to be supplied for melt spinning has a number average molecular weight $Mn_P$ of preferably 50,000 to 100,000, and more preferably 55,000 to 80,000. Further, the polypropylene fibers A after spinning have a number average molecular weight $Mn_F$ of preferably 50,000 to 100,000, and more preferably 55,000 to 80,000.

Further, the ratio of a weight average molecular weight $Mw_F$ of the polypropylene fibers A after spinning with respect to a weight average molecular weight $Mw_P$ of the polypropylene to be supplied for melt spinning is preferably 0.6 to 0.9, and more preferably 0.7 to 0.8. The $Mw_F/Mw_P$ indicates the change amount of the weight average molecular weight of polymers before and after spinning, meaning that the smaller the value, the less the amount of high molecular weight polymers after fibrization. When the $Mw_F/Mw_P$ is in a range of 0.6 to 0.9, the molecular weight distribution becomes narrow because of proper decomposition of part of the high molecular weight polymers. Thereby, fibers capable of being oriented easily can be obtained.

Specifically, the polypropylene to be supplied for melt spinning has a weight average molecular weight $Mw_P$ of preferably 300,000 to 450,000, and more preferably 350,000 to 400,000. Further, the polypropylene fibers A after spinning have a weight average molecular weight $Mw_F$ of preferably 200,000 to 350,000, and more preferably 250,000 to 300,000.

Moreover, the ratio of a Z average molecular weight $Mz_F$ of the polypropylene fibers A after spinning with respect to a Z average molecular weight $Mz_P$ of the polypropylene to be supplied for melt spinning is preferably 0.5 to 0.8, and more preferably 0.6 to 0.7. The $Mz_F/Mz_P$ indicates the change amount of the Z average molecular weight of polymers before and after spinning, meaning that the smaller the value, the less the amount of high molecular weight polymers after spinning. When the $Mz_F/Mz_P$ is in a range of 0.5 to 0.8, the molecular weight distribution becomes narrow because of proper decomposition of part of high molecular weight polymers. Thereby, fibers capable of being oriented easily can be obtained.

Specifically, the Z average molecular weight $Mz_P$ of the polypropylene to be supplied for melt spinning is 1,000,000 or more. An upper limit thereof is not limited particularly, and may be 2,000,000, for example. Further, the Z average molecular weight $Mz_F$ of the polypropylene fibers A after spinning is less than 1,000,000, preferably 600,000 to 950,000, and more preferably 700,000 to 800,000.

In the production of the polypropylene fibers A, the polypropylene to be supplied for melt spinning has an isotactic pentad fraction (hereinafter, also referred to as IPF) of preferably 90% or more, and more preferably 93% or more. When the IPF is 90% or more, thermal decomposition occurs easily. The possible explanation for this is that thermal decomposition of polypropylene occurs easily at an isotactic part, i.e., at a structural part where asymmetric carbons have the same absolute configuration.

The polypropylene to be used for the production of the polypropylene fibers A may be polymerized by any polymerization method. For example, it may be polymerized using a metallocene catalyst or a Ziegler-Natta catalyst. Further, the polypropylene to be used for the production of the polypropylene fibers A may be a homopolymer of propylene, or a copolymer of propylene and other α-olefins with a carbon number of about 2 to 20.

The cement reinforcing fibers of the present invention have a single fiber fineness of preferably 0.1 to 200 dtex, more preferably 0.2 to 50 dtex, and further preferably 0.3 to 5 dtex. The fiber length is preferably about 1 to 20 mm. Within these ranges, the fibers can be mixed and dispersed easily in cement slurry, thereby exhibiting an effect of reinforcing the strength easily.

The cement reinforcing fibers of the present invention have a single fiber strength of preferably 5 cN/dtex or more, and more preferably 7 cN/dtex or more, the single fiber strength being measured in accordance with JIS L 1015. Incidentally, the preferred upper limit is 20 cN/dtex. Within this range, the bending strength of the cured cement improves, and further, a fiber ball (lump) is less likely to be formed when mixing and stirring the cement slurry.

The cement reinforcing fibers of the present invention have a fiber elongation of preferably 15 to 45%, and more preferably 20 to 30%, the fiber elongation being measured in accordance with JIS L 1015. Within this range, the impact strength of the cured cement improves, and further, cracks are less likely to be produced in the cured cement.

The cement reinforcing fibers of the present invention have a Young's modulus of preferably 3,000 MPa or more, and more preferably 4,000 MPa or more, the Young's modulus being measured in accordance with JIS L 1015. When the Young's modulus is 3,000 MPa or more, the fibers are less likely to deform, and cracks are less likely to be produced in the cured cement.

The present invention also provides a cured cement that preferably contains 0.1 to 5 mass % of the above-described cement reinforcing fibers. When the content of the cement reinforcing fibers is 0.1 mass % or more, it is possible to obtain a cured cement excellent in impact strength and bending strength. Further, when the content of the cement reinforcing fibers is 5 mass % or less, a fiber ball (lump) is less likely to be formed when mixing and stirring the cement slurry. For example, it is possible to obtain a cured cement by mixing, stirring, and curing cement slurry that contains cement, aggregate, water, and the above-described cement reinforcing fibers.

EXAMPLES

Hereinafter, the present invention will be described more specifically by way of examples. However, the present invention is not limited to the following examples.

Examples 1-10, Comparative Examples 1-2

Production of Polypropylene Multifilaments

As a raw material polymer, polypropylene (trade name: SA01A, manufactured by Japan Polypropylene Corporation)

was used. The polypropylene was melt and extruded from a spinning nozzle having a hole diameter of 0.6 mm at a spinning temperature of 270° C., and taken up at a take-up ratio (spinning draft) of 56.6 times while cooling the vicinity of the spinning nozzle, whereby spun filaments having a fineness of 100 dtex were obtained. Next, the obtained spun filaments were subjected to dry drawing at a draw ratio of 5.0 times at a draw temperature of 160° C., whereby a polypropylene multifilament (the number of filaments: 60) having a fineness of 20 dtex was obtained.

The obtained polypropylene multifilament was subjected to a corona discharge treatment through a corona discharge treatment machine at a discharge amount of 0.5 kW/m²/min for hydrophilization. Next, as a fiber treating agent, 1.0 mass % of potassium polyoxyethylene lauryl phosphate (trade name: DPF971, manufactured by TAKEMOTO OIL & FAT Co., Ltd.) containing 5 mol of oxyethylene groups (POE) and having a carbon chain length of 12 was attached to the hydrophilized multifilament, whereby a multifilament of Example 1 was obtained.

In Examples 2-10 and Comparative Examples 1-2, as shown in Table 1 below, the type of the fiber treating agent and presence or absence of a corona discharge treatment (corona) were changed.

The pull-out strength of each of the multifilaments of Examples 1-10 and Comparative Examples 1-2 was measured in the following manner. Table 1 below shows the results.

<Pull-Out Strength>

First, the multifilament was cut into 5 cm lengths to produce a filament sample. Next, 400 g of cement, 100 g of silica sand, 5 g of crushed pulp and 150 g of water were mixed and stirred to produce a lower cement body of 5 cm in length, 4 cm in width and 0.5 cm in thickness. Then, 400 g of cement, 100 g of silica sand, 5 g of crushed pulp and 200 g of water were mixed and stirred to produce an upper cement body of 5 cm in length, 4 cm in width and 0.5 cm in thickness. Thereafter, before curing of the lower cement body, the filament sample was arranged along the width direction in the center in the longitudinal direction, and the upper cement body before curing was placed thereon, whereby a measurement sample for measuring a pull-out strength was obtained. Incidentally, in the measurement sample, the filament sample was located within the cement body in a length of 4 cm, and located outside the cement body in a length of 1 cm. After natural curing of the measurement sample for 28 days, the filament sample was pulled out from the cement body of the measurement sample at a speed of 2 cm/min. The maximum load at this time was defined as a pull-out strength. Further, regarding each of the measurement samples of Example 2 and Comparative Example 2, after autoclave curing at 150° C. for 16 hours, the pull-out strength was measured in the same manner as described above.

TABLE 1

|  | Corona | Carbon chain length | The number of moles of POE (mol) | Pull-out strength (gf) Natural curing | Pull-out strength (gf) Autoclave curing |
| --- | --- | --- | --- | --- | --- |
| Example 1 | Yes | 12 | 5 | 3500 | — |
| Example 2 | No | 12 | 5 | 1800 | 4600 |
| Example 3 | Yes | 12 | 3 | 3400 | — |
| Example 4 | Yes | 8 | 1 | 3000 | — |
| Example 5 | Yes | 18 | 4 | 2000 | — |
| Example 6 | Yes | 16 | 15 | 2500 | — |
| Example 7 | No | 12 | 3 | 2300 | — |
| Example 8 | No | 8 | 1 | 1500 | — |
| Example 9 | No | 8 | 4 | 3300 | — |
| Example 10 | No | 8 | 7 | 3650 | — |
| Comparative Example 1 | No | 12 | 0 | 450 | — |
| Comparative Example 2 | No | 8 | 0 | 900 | 3800 |

From the results of Table 1 above, it was confirmed that the filaments of Examples had a higher pull-out strength than the filaments of Comparative Examples. Having a higher pull-out strength means that, as compared with the filaments of Comparative Examples, the filaments of Examples had a higher affinity for a cured cement while preventing the fiber treating agent from dropping off easily. This is because the fiber treating agents attached to the fibers of Examples had polyoxyethylene groups (POE), whereas the fiber treating agents attached to the fibers of Comparative Examples did not have polyoxyethylene groups (POE). Further, the filaments of Examples 1, 3 and 4 had a higher pull-out strength than the filaments of Examples 2, 7 and 8, respectively. The possible explanation for this is that, in Examples 1, 3 and 4, since the fiber treating agent was attached to the fibers that had been hydrophilized by the corona discharge treatment, the affinity for a cured cement was enhanced further.

Examples 11-14, Comparative Examples 3-6

Production of Polypropylene Short Fibers

As a raw material polymer, polypropylene (trade name: SA01A, manufactured by Japan Polypropylene Corporation) was used. The polypropylene was melt and extruded from a spinning nozzle having a hole diameter of 0.6 mm at a spinning temperature of 270° C., and taken up at a take-up ratio (spinning draft) of 142 times while cooling the vicinity of the spinning nozzle, whereby spun filaments having a fineness of 4.0 dtex were obtained. Next, the obtained spun filaments were subjected to dry drawing at a draw ratio of 4.4 times at a draw temperature of 160° C., whereby drawn filaments having a fineness of 0.9 dtex were obtained. The obtained drawn filaments had a single fiber strength of 8.9 cN/dtex, a fiber elongation of 25%, and a Young's modulus of 6,700 MPa.

The obtained drawn filaments were subjected to a corona discharge treatment through a corona discharge treatment machine at a discharge amount of 0.5 kW/m²/min for hydrophilization. Next, as a fiber treating agent, 1 mass % of potassium polyoxyethylene lauryl phosphate (trade name: DPF971, manufactured by TAKEMOTO OIL & FAT Co., Ltd.) containing 5 mol of oxyethylene groups and having a carbon chain length of 12 was attached to the hydrophilized filaments, and the resultants were cut into 6 mm lengths, whereby polypropylene short fibers of Example 11 were obtained.

In Examples 12-14 and Comparative Examples 3-6, as shown in Table 2 below, the type of the fiber treating agent, presence or absence of the corona discharge treatment (corona) and kneading of calcium carbonate particles (kneading of calcium carbonate) were changed. The kneading of calcium carbonate particles was performed such that, after spinning using a core-sheath conjugate nozzle to produce fibers composed of a core component and a sheath component, both made of polypropylene, at a core-sheath ratio of 8:2, 6 mass % (1.2 mass % with respect to 100 mass % of polypropylene fibers) of calcium carbonate particles were kneaded only into the sheath component. Calcium carbonate particles (average particle diameter: 0.57 μm) manufactured by Takehara Kagaku Kogyo Co., Ltd. were used as the calcium carbonate particles.

The Charpy impact strength and the bending strength of each of the cured cements containing the polypropylene short fibers of Examples 11-14 and Comparative Examples 3-6 were measured as below. Table 2 below shows the results. Further, Table 2 shows, as a relative MOR, a value calculated by dividing the modulus of rupture (MOR) by the density. Incidentally, Table 2 also shows results of vinylon fibers (manufactured by Unitika Ltd., trade name: 22A, fineness: 2.2 dtex, fiber length: 6 mm) as Reference Example 1.

<Test Method of Charpy Impact Strength>

400 g of portland cement, 100 g of silica sand, 5 g of crushed pulp, 1.5 g of cement reinforcing fibers (polypropylene short fibers) and 4500 g of water were stirred and mixed thoroughly to produce a cured cement of 25 cm in length and 25 cm in width, and it was cured naturally for 28 days at room temperature to obtain a cement sample. Then, a measurement sample of 1 cm in length and 13 cm in width was formed from the cement sample. The Charpy impact strength was measured in accordance with JIS B 7722.

<Test Method of Bending Strength>

A cement sample was obtained in the same manner as in the test method of the Charpy impact strength. A measurement sample of 5 cm in length and 10 cm in width was formed from the cement sample, and the limit of proportionality (LOP) and the modulus of rupture (MOR) were measured in accordance with JIS A 1408.

<Relative MOR>

A value calculated by dividing the modulus of rupture MOR by the density is indicated as a relative MOR.

parative Example 3. Further, the cured cement containing the fibers of Example 14 had a higher relative MOR than the cured cement containing the fibers of Comparative Example 4. These results indicate that the cured cements containing the fibers of Examples to which the polyoxyethylene alkyl phosphoric ester salt had been attached had a more excellent modulus of rupture than the cured cements containing the fibers to which the conventional fiber treating agents had been attached. In other words, it was confirmed that Examples of the present invention can provide cement reinforcing fibers having a high affinity for a hydraulic cured body while preventing a fiber treating agent from dropping off easily.

In Examples, the cured cement containing the filaments of Example 11 or 13 that had been hydrophilized by a corona discharge treatment had a higher relative MOR than the cured cement containing the filaments of Example 12 or 14 without a hydrophilization treatment. This indicates that in Examples of the present invention, by attaching the fiber treating agent to the fibers that had been hydrophilized in advance, the affinity for cement was particularly enhanced due to a synergistic effect of the hydrophilization treatment and the fiber treating agent. On the other hand, in Comparative Examples, the cured cement containing the filaments of Comparative Example 3 that had been hydrophilized by a corona discharge treatment had a lower relative MOR than the cured cement containing the filaments of Comparative Example 4 without hydrophilization. This indicates that the synergistic effect of the hydrophilization treatment and the fiber treating agent cannot be obtained by attaching the fiber treating agents used in Comparative Examples to the fibers that had been hydrophilized in advance.

Examples 15-17

Production of Polypropylene Multifilaments

Multifilaments of Examples 15-17 were obtained in accordance with the same procedure as in Example 2, except for the

TABLE 2

| | Kneading of calcium carbonate | Corona | Carbon chain length | The number of moles of POE (mol) | Thickness (cm) | Density (g/cm$^3$) | Charpy impact strength (kJ/m$^2$) | Limit of proportionality LOP (kg/cm$^2$) | Modulus of rupture MOR (kg/cm$^2$) | Relative MOR |
|---|---|---|---|---|---|---|---|---|---|---|
| Example 11 | No | Yes | 12 | 5 | 0.54 | 1.73 | 2.74 | 55.8 | 35.8 | 20.6 |
| Example 12 | No | No | 12 | 5 | 0.54 | 1.68 | 3.07 | 61.2 | 17.3 | 10.2 |
| Example 13 | Yes | Yes | 12 | 5 | 0.60 | 1.53 | 2.61 | 41.1 | 34.4 | 22.4 |
| Example 14 | Yes | No | 12 | 5 | 0.62 | 1.56 | 2.41 | 51.7 | 33.0 | 21.2 |
| Comparative Example 3 | Yes | Yes | 12 | 0 | 0.55 | 1.60 | 2.69 | 51.9 | 15.4 | 9.6 |
| Comparative Example 4 | Yes | No | 12 | 0 | 0.54 | 1.62 | 2.89 | 40.8 | 23.0 | 14.2 |
| Comparative Example 5 | No | No | 12 | 0 | 0.53 | 1.88 | 3.65 | 41.6 | 16.6 | 8.8 |
| Comparative Example 6 | No | No | 8 | 0 | 0.56 | 1.76 | 4.14 | 47.0 | 21.4 | 12.2 |
| Reference Example 1 | Vinylon fiber | | | | 0.59 | 1.57 | 0.93 | 41.5 | 22.0 | 14.0 |

The cured cement containing the fibers of Example 12 had a higher relative MOR than the cured cement containing the fibers of Comparative Example 5. Further, the cured cement containing the fibers of Example 13 had a higher relative MOR than the cured cement containing the fibers of Comparative Example 5.

attachment amount of the fiber treating agent as shown in Table 3 below.

The pull-out strength of each of the multifilaments of Examples 15-17 was measured as described above. Table 3 below shows the results.

TABLE 3

| | Corona | Carbon chain length | The number of moles of POE (mol) | The attachment amount of fiber treating agent (mass %) | Pull-out strength (gf) Natural curing |
|---|---|---|---|---|---|
| Example 15 | No | 12 | 5 | 1.5 | 2200 |
| Example 16 | No | 12 | 5 | 1.0 | 2000 |
| Example 17 | No | 12 | 5 | 0.5 | 1300 |

All of the filaments of Examples 15-17 exhibited a high pull-out strength as compared with the filaments of Comparative Examples 1 and 2 in Table 1. This indicates that the fibers of the present invention acquired a high affinity for a cured cement by attaching the polyoxyethylene alkyl phosphoric ester salt as the fiber treating agent.

Examples 18-21

Production of Polypropylene Short Fibers

As a raw material polymer, polypropylene having a number average molecular weight Mn of 69,100, a weight average molecular weight Mw of 380,000, a Z average molecular weight Mz of 1,160,000, a Mw/Mn of 5.50, a Mz/Mw of 3.05 and a fusion enthalpy $\Delta H_{P1}$ of 79.2 J/g was used. The polypropylene was melt and extruded from a spinning nozzle having a hole diameter of 0.6 mm at a spinning temperature of 300° C., and taken up at a take-up ratio (spinning draft) of 585 times while cooling the vicinity of the spinning nozzle, whereby spun filaments having a fineness of 4.4 dtex were obtained. Next, the obtained spun filaments were subjected to dry drawing at a draw ratio of 4.0 times at a draw temperature of 155° C., whereby drawn filaments having a fineness of 1.3 dtex were obtained. The obtained drawn filaments had a single fiber strength of 8.0 cN/dtex, a fiber elongation of 28.5%, and a Young's modulus of 5,400 MPa.

Incidentally, the drawn filaments had a number average molecular weight Mn of 70,000, a weight average molecular weight Mw of 316,000, a Z average molecular weight Mz of 900,000, a Mw/Mn of 4.51, a Mz/Mw of 2.85, a fusion enthalpy $\Delta H_F$ of 108 J/g, a fusion enthalpy $\Delta H_{P2}$ of 78.2 J/g, and $\Delta H_F$-$\Delta H_{P2}$ of 29.8 J/g.

The obtained drawn filaments were subjected to a corona discharge treatment through a corona discharge treatment machine at a discharge amount of 0.5 kW/m²/min for hydrophilization. Next, as a fiber treating agent, 1 mass % of potassium polyoxyethylene lauryl phosphate (trade name: DPF971, manufactured by TAKEMOTO OIL & FAT Co., Ltd.) containing 5 mol of oxyethylene groups and having a carbon chain length of 12 was attached to the hydrophilized filaments, and the resultants were cut into 6 mm lengths, whereby polypropylene short fibers of Example 18 were obtained.

In Examples 19, 20 and Comparative Example 7, the fiber treating agent was changed to those shown in Table 6 below.

The polypropylene short fibers of Example 21 were obtained in accordance with the production method of the polypropylene short fibers of Example 18, except for the use of polypropylene (trade name: SA01A, manufactured by Japan Polypropylene Corporation) as a raw material polymer.

Tables 4 and 5 respectively show the molecular weights and the fusion enthalpies of polypropylenes (polymer pellets) used as a raw material polymer in Examples 18 and 21 and of polypropylene short fibers obtained therefrom. Further, Table 5 below also shows the single fiber strength and the fiber elongation of the fibers.

The Charpy impact strength and the bending strength of each of the cured cements containing the polypropylene short fibers of Examples 18-21 were measured as described above. Table 6 below shows the results. Further, Table 6 shows, as a relative MOR, a value calculated by dividing the modulus of rupture (MOR) by the density.

TABLE 4

| | | Number average molecular weight Mn | Weight average molecular weight Mw | Z average molecular weight Mz | Polydispersity | |
|---|---|---|---|---|---|---|
| | | | | | Mw/Mn | Mz/Mw |
| Example 18 | Polymer pellet | 69100 | 380000 | 1160000 | 5.50 | 3.05 |
| | Fiber | 70000 | 316000 | 900000 | 4.51 | 2.85 |
| Example 21 | Polymer pellet | 90600 | 329000 | 811000 | 3.63 | 2.47 |
| | Fiber | 95000 | 312000 | 782000 | 3.28 | 2.51 |

TABLE 5

| | $\Delta H_{P1}$ | $\Delta H_F$ | $\Delta H_{P2}$ | $\Delta H_F$ – $\Delta H_{P2}$ | Strength (cN/dtex) | Elongation (%) |
|---|---|---|---|---|---|---|
| Example 18 | 79.2 J/g | 108 J/g | 78.2 J/g | 29.8 J/g | 8.00 | 28.5 |
| Example 21 | 87.9 J/g | 110 J/g | 86.9 J/g | 23.1 J/g | 7.31 | 29.5 |

TABLE 6

| | Kneading of calcium carbonate | Corona | Carbon chain length | The number of moles of POE (mol) | Thickness (cm) | Density (g/cm³) | Charpy impact strength (kJ/m²) | Limit of proportionality LOP (kg/cm²) | Modulus of rupture MOR (kg/cm²) | Relative MOR |
|---|---|---|---|---|---|---|---|---|---|---|
| Example 18 | No | Yes | 12 | 5 | 0.47 | 1.78 | 3.60 | 52.4 | 36.2 | 20.3 |
| Example 19 | No | Yes | 8 | 4 | 0.48 | 1.76 | 3.42 | 50.5 | 32.0 | 18.2 |

TABLE 6-continued

|  | Kneading of calcium carbonate | Corona | Carbon chain length | The number of moles of POE (mol) | Thickness (cm) | Density (g/cm³) | Charpy impact strength (kJ/m²) | Limit of proportionality LOP (kg/cm²) | Modulus of rupture MOR (kg/cm²) | Relative MOR |
|---|---|---|---|---|---|---|---|---|---|---|
| Example 20 | No | Yes | 8 | 7 | 0.48 | 1.84 | 3.52 | 59.1 | 34.7 | 18.9 |
| Example 21 | No | Yes | 12 | 5 | 0.48 | 1.76 | 3.85 | 50.6 | 34.9 | 19.9 |
| Comparative Example 7 | No | Yes | 12 | 0 | 0.53 | 1.88 | 3.47 | 40.3 | 15.2 | 8.1 |

The cured cement containing the fibers of Example 18 had a higher relative MOR than the cured cement containing the fibers of Comparative Example 7. From this result, it was confirmed that the cured cement containing the fibers of Examples to which the polyoxyethylene alkyl phosphoric ester salt had been attached had a more excellent modulus of rupture than the cured cement containing the fibers to which the conventional fiber treating agent had been attached.

The cured cement containing the cement reinforcing fibers of Example 18 had a larger limit of proportionality LOP, modulus of rupture MOR and relative MOR than the cured cement containing the cement reinforcing fibers of Example 21. From this result, it was confirmed that the cured cement containing the polypropylene fibers A can acquire a particularly excellent limit of proportionality (LOP), modulus of rupture (MOR) and relative MOR.

INDUSTRIAL APPLICABILITY

The cement reinforcing fibers of the present invention can be used as cement reinforcing fibers that are mixed into a cement mixture to form a molding through natural curing or autoclave curing. Of these, the fibers are suitable for autoclave curing because of their high heat resistance. Other than these, the fibers can be applied to air curing, water curing, moisture curing, and the like. As a molding method, the fibers can be applied to casting molding, vibration molding, centrifugal molding, suction molding, extrusion molding, press molding, and the like. As a molding product, the fibers can be applied to an extruded cement panel (ECP), a precast concrete (PC) panel, and the like, and can be used as an exterior wall material, a roof material, an accessory, and the like.

The invention claimed is:

1. A cement reinforcing fiber made of a polyolefin fiber, wherein a fiber treating agent containing a polyoxyethylene alkyl phosphoric ester salt in an amount of 90 mass % or more is adhered to a surface of the polyolefin fiber, and
the polyoxyethylene alkyl phosphoric ester salt is at least one compound selected from the group consisting of a compound represented by chemical formula (2) below and a compound represented by chemical formula (3) below:

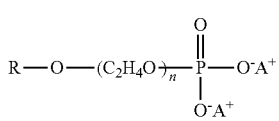

(2)

where in the chemical formula (2), R is an alkyl group with a carbon number of 2 to 20, A is an alkali metal element, and n is 1 to 20; and

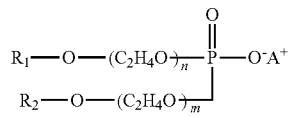

(3)

where in the chemical formula (3), $R_1$ and $R_2$ are an alkyl group with a carbon number of 2 to 20, A is an alkali metal element or an alkaline-earth metal element, and n and m are 1 to 20.

2. The cement reinforcing fiber according to claim 1, wherein an adhesion amount of the polyoxyethylene alkyl phosphoric ester salt is in a range of 0.1% to 5% by mass based on 100% by mass of the polyolefin fiber.

3. The cement reinforcing fiber according to claim 2, wherein the polyolefin fiber is hydrophilized through at least one hydrophilization treatment selected from a fluorine gas treatment, a plasma discharge treatment, and a corona discharge treatment.

4. The cement reinforcing fiber according to claim 1, wherein the polyolefin fiber is hydrophilized through at least one hydrophilization treatment selected from a fluorine gas treatment, a plasma discharge treatment, and a corona discharge treatment.

5. The cement reinforcing fiber according to claim 1,
wherein n in the polyoxyethylene alkyl phosphoric ester salt represented by the chemical formula (2) is 1 to 15, and
n and m in the polyoxyethylene alkyl phosphoric ester salt represented by the chemical formula (3) are 1 to 15.

6. A cured cement comprising a cement reinforcing fiber made of a polyolefin fiber,
wherein a fiber treating agent is adhered to a surface of the polyolefin fiber,
the fiber treating agent is a polyoxyethylene alkyl phosphoric ester salt, and
the polyoxyethylene alkyl phosphoric ester salt is at least one compound selected from the group consisting of a compound represented by chemical formula (2) below and a compound represented by chemical formula (3) below:

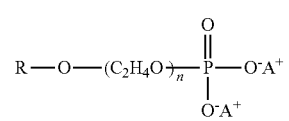

(2)

where in the chemical formula (2), R is an alkyl group with a carbon number of 2 to 20, A is an alkali metal element, and n is 1 to 20; and

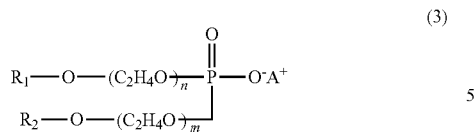

(3)

where in the chemical formula (3), $R_1$ and $R_2$ are an alkyl group with a carbon number of 2 to 20, A is an alkali metal element or an alkaline-earth metal element, and n and m are 1 to 20.

7. The cured cement according to claim 6, wherein an adhesion amount of the polyoxyethylene alkyl phosphoric ester salt is in a range of 0.1% to 5% by mass based on 100% by mass of the polyolefin fiber.

8. The cured cement according to claim 7, wherein the polyolefin fiber is hydrophilized through at least one hydrophilization treatment selected from a fluorine gas treatment, a plasma discharge treatment, and a corona discharge treatment.

9. The cured cement according to claim 6, wherein the polyolefin fiber is hydrophilized through at least one hydrophilization treatment selected from a fluorine gas treatment, a plasma discharge treatment, and a corona discharge treatment.

10. The cured cement according to claim 6,
wherein n in the polyoxyethylene alkyl phosphoric ester salt represented by the chemical formula (2) is 1 to 15, and
n and m in the polyoxyethylene alkyl phosphoric ester salt represented by the chemical formula (3) are 1 to 15.

* * * * *